Sept. 11, 1962 H. J. HUTTENLOCHER, JR 3,054,008
SERVOMOTORS
Filed Aug. 25, 1958
FIG_1
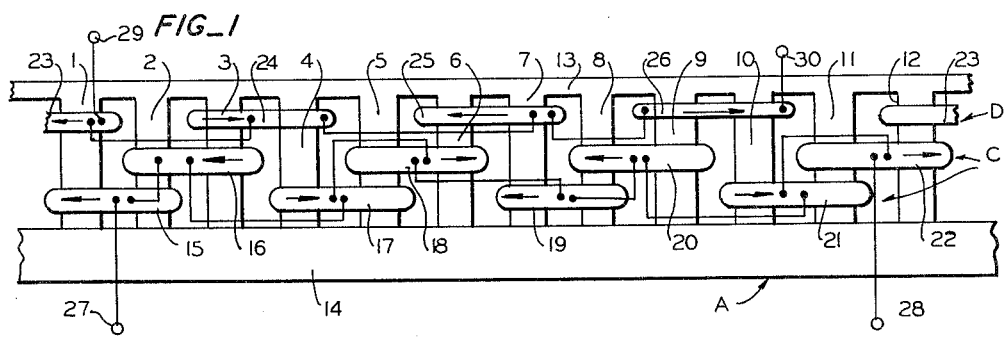
FIG_2
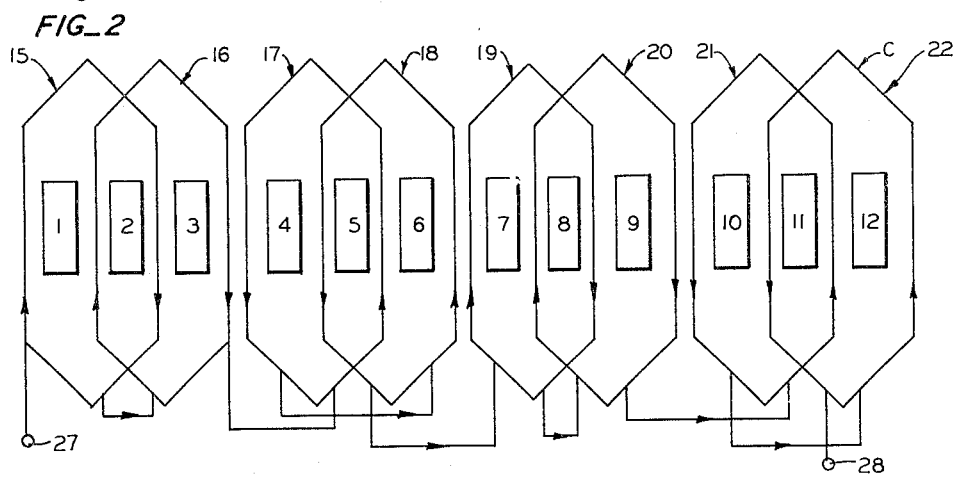
FIG_3
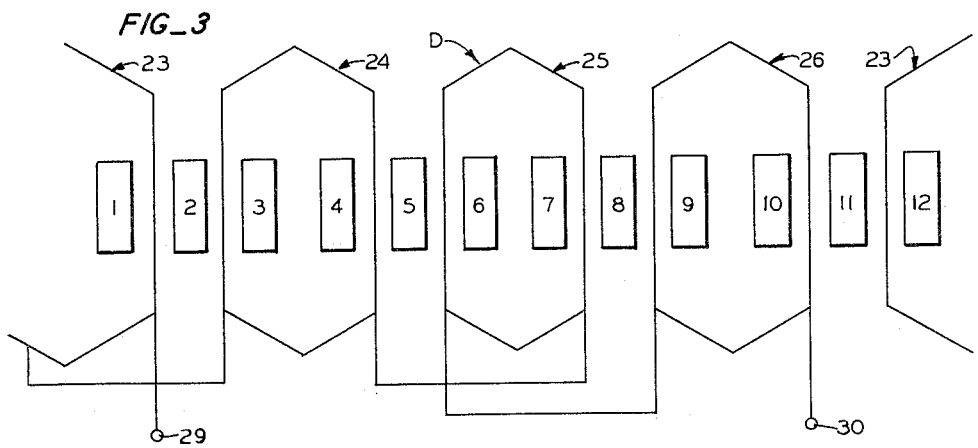
FIG_4
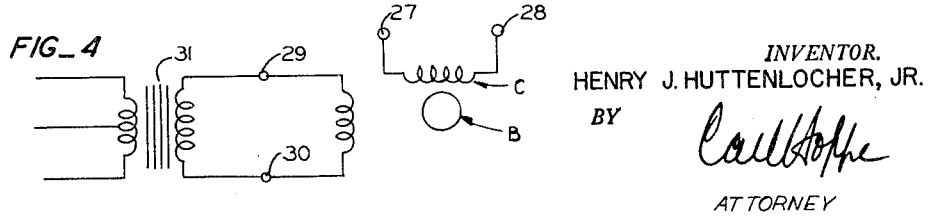
INVENTOR.
HENRY J. HUTTENLOCHER, JR.
BY
ATTORNEY United States Patent Office 3,054,008
Patented Sept. 11, 1962

3,054,008
SERVOMOTORS
Henry J. Huttenlocher, Jr., Plainview, N.Y., assignor to Servomechanisms, Inc., Hawthorne, Calif., a corporation of New York
Filed Aug. 25, 1958, Ser. No. 756,967
6 Claims. (Cl. 310—184)

This invention relates to servomotors and more particularly to an improved polyphase alternating current servomotor having an outside pack winding and providing an unusually low starting voltage.

Polyphase alternating current servomotors, such as are commonly used for control purposes, are usually provided with a fixed field winding and with a control field winding which is arranged in phase quadrature with the fixed field winding and which is energized by a control voltage of changeable polarity and variable magnitude.

One of the problems of existing servomotors is that their cogging is relatively high, thereby making them relatively insensitive to low starting voltage in the control field winding.

One of the objects of this invention is to provide a servomotor having a relatively low cogging effect and capable of being energized by relatively low starting voltages.

Another object of this invention is to provide in such a servo motor a linear curve of control field voltage versus stall torque.

The foregoing and other objects of this invention will become apparent to those skilled in the art upon an understanding of the following written description of a selected embodiment of this invention when considered in connection with the accompanying drawings and the appended claims.

In the drawings:

FIG. 1 is a diagrammatic unfurled representation of an end view of the stator, it being understood that in actual practice the stator is cylindrically formed, with the upper part of FIG. 1 representing the tunnel, within which the rotor is mounted, and the lower portion of FIG. 1 representing the exterior surface of the stator;

FIG. 2 is a diagrammatic developed view of the fixed field winding disclosed in FIG. 1;

FIG. 3 is a diagrammatic developed view of the control field winding disclosed in FIG. 1; and FIG. 4 is a schematic circuit diagram showing the servomotor of this invention connected in a typical servo control system.

The illustrative embodiment of this invention comprises a cylindrically formed multipole stator A, a rotor B, a fixed field winding C, and a control field winding D.

The stator A illustrated comprises a stack of uniformly stamped relatively thin permeable laminations forming a plurality of permeable teeth 1 to 12, both inclusive, and defining winding slots between adjacent teeth. The teeth are all directed radially outwardly from an annular tunnel portion 13 toward a separate outer annular portion 14 of the stator which is magnetically connected to the outer ends of said teeth for completion of the magnetic flux paths through the rotor, the teeth and the outer portion 14.

An outside packed fixed field winding C is provided in the slots of the stator A, and it consists of eight coils, 15, 16, 17, 18, 19, 20, 21 and 22, all connected in series and each spanning two teeth and forming four fixed poles normally centered on teeth 2, 5, 8 and 11. It is an essential feature of the illustrative embodiment of this invention that the fixed field winding C must be wound so that every winding slot is occupied by one or more coils of the fixed field winding.

A control field winding D comprises four coils 23, 24, 25 and 26, each bridging adjacent poles of the motor, and, in the illustrative embodiment, each spanning two adjacent teeth of the stator.

Terminals 27, 28 at either end of the fixed field winding C are connected to a source of alternating current of fixed value, and terminals 29, 30 at either end of the control winding connect the control winding to a source of control voltage of changeable polarity and variable magnitude such as that provided by the output transformer 31 of a servo-amplifier (not illustrated).

Applicant has observed that the servomotor described herein has a starting voltage considerably lower than the starting voltage of prior art servomotors of the same weight and size, thereby energizing the rotor at lower starting voltages than have heretofore been obtainable. By way of specific example, applicant has made comparable tests upon two identically-sized servomotors, one having a typical prior art distributed winding, and the other having the distributed windnig herein disclosed wherein the fixed field winding is wound so as to occupy all of the slots of the motor. The results are tabulated below.

| Rated Voltage | | Control Field Starting Voltage | | |
|---|---|---|---|---|
| | | Prior Motor Art | | Illustrative Embodiment, volt |
| Fixed Field | Control Field | Outside Pack | Inside Pack | |
| 115 | 115 | 6 | 2 | 1 |
| 115 | 57 | 3 | 1 | ½ |
| 115 | 40 | 2 | ⅔ | ⅓ |

Various modifications of the present invention may be obvious to those skilled in this art without departing from the scope of this invention. Therefore, the invention is not to be construed as being limited to the illustrative embodiment disclosed but is defined by the appended claims.

I claim:

1. In a polyphase alternating current motor having a permeable tunnel, a plurality of teeth forming poles of said motor and extending outwardly from said tunnel and forming winding slots therebetween, an annular portion magnetically connected to the outer ends of said teeth, a fixed multicoil field winding in said slots, and a multicoil control field winding in said slots, the improvement which comprises said fixed field winding being wound with one or more coils of said winding being placed in each and every slot of said motor.

2. In a polyphase alternating current motor having a permeable tunnel, a plurality of teeth forming poles of said motor and extending outwardly from said tunnel and forming winding slots therebetween, an annular portion magnetically connected to the outer ends of said teeth, a fixed multicoil distributed field winding in said slots, and a multicoil control field winding in said slots, the improvement which comprises said fixed field winding being distributed with one or more coils of said winding being placed in each and every slot of said motor.

3. In a polyphase alternating current motor having a permeable tunnel, a plurality of teeth forming poles of said motor and extending outwardly from said tunnel and forming winding slots therebetween, an annular portion magnetically connected to the outer ends of said teeth, a fixed multicoil field winding in said slots, and a multicoil control field winding in said slots, the improvement which comprises said fixed field winding being wound with one or more coils of said winding being placed in each and every slot of said motor, and said control winding bridging adjacent poles of said stator and each coil spanning only two adjacent teeth of said stator.

4. In a polyphase alternating current motor having a permeable tunnel, a plurality of teeth forming poles of said motor and extending outwardly from said tunnel and forming winding slots therebetween, an annular portion magnetically connected to the outer ends of said teeth, a fixed multicoil distributed field winding in said slots, and a multicoil control field winding in said slots, the improvement which comprises said fixed field winding being distributed with one or more coils of said winding being placed in each and every slot of said motor, and said control winding bridging adjacent poles of said stator and each coil spanning only two adjacent teeth of said stator.

5. A polyphase alternating servomotor having a rotor, a multipole stator comprising an annular tunnel portion, a plurality of teeth extending radially outwardly from said tunnel portion and defining winding slots between adjacent teeth, an outside packed fixed field winding consisting of a plurality of coils, connected in series, every winding slot being occupied by one or more of said coils, an outside packed control field winding consisting of a plurality of coils connected in series, and each bridging adjacent poles of said stator, and an annular portion magnetically connected to the outer ends of said teeth and completing the magnetic flux paths through the rotor, the teeth, and the annular portion.

6. A polyphase alternating servomotor having a rotor, a multipole stator comprising an annular tunnel portion, a plurality of teeth extending radially outwardly from said tunnel portion and defining winding slots between adjacent teeth, an outside packed distributed fixed field winding consisting of a plurality of coils, connected in series, every winding slot being occupied by one or more of said coils, an outside packed control field winding consisting of a plurality of coils connected in series, and each bridging only adjacent teeth of adjacent poles of said stator, and an annular portion magnetically connected to the outer ends of said teeth and completing the magnetic flux paths through the rotor, the teeth, and the annular portion.

References Cited in the file of this patent

UNITED STATES PATENTS

| | | |
|---|---|---|
| 2,474,647 | Binney | June 28, 1949 |
| 2,547,599 | Roters | Apr. 3, 1951 |
| 2,671,876 | Spielberg et al. | Mar. 9, 1954 |
| 2,871,384 | Gabriel | Jan. 27, 1959 |